Figure 1:
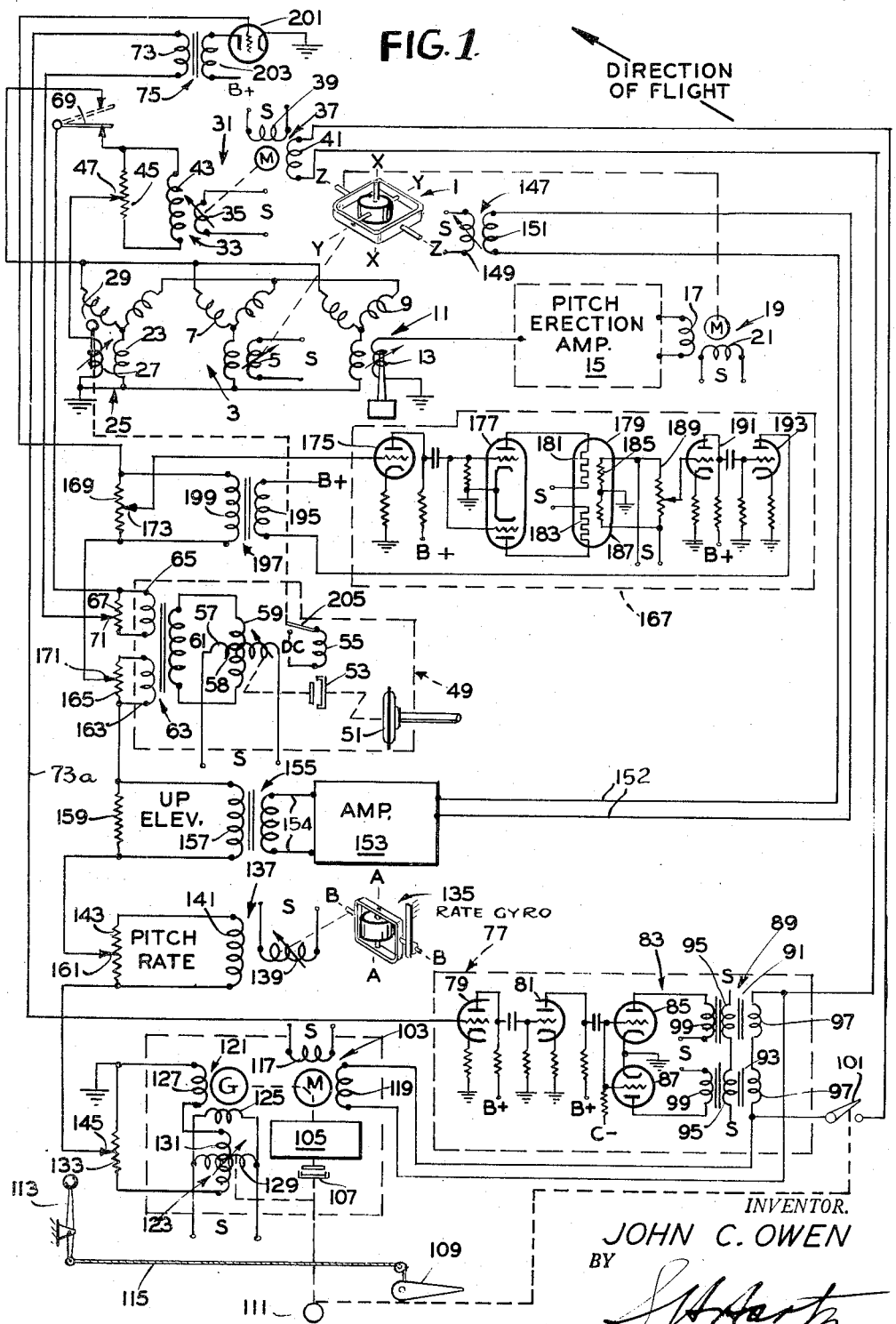

Sept. 9, 1958    J. C. OWEN    2,851,645
ELECTRIC SERVOMOTOR DIRECTIONAL CONTROL SYSTEM
Filed March 28, 1951    2 Sheets-Sheet 1

INVENTOR.
JOHN C. OWEN
BY
S. H. Hartz

United States Patent Office 2,851,645
Patented Sept. 9, 1958

2,851,645

ELECTRIC SERVOMOTOR DIRECTIONAL CONTROL SYSTEM

John C. Owen, Palisades Park, N. J., assignor to Bendix Aviation Corporation, Teterboro, N. J., a corporation of Delaware Application March 28, 1951, Serial No. 217,988

8 Claims. (Cl. 318—489)

The invention relates to control systems for aircraft and has as an object to provide a system for aircraft which controls the craft automatically after the craft has been operated manually without producing abrupt deflections of the craft control surfaces and erratic flight of the craft.

Another object is to automatically trim the craft by changing the deflection of the control surface to accommodate a shift in loading of the craft or other cause.

Another object is to trim the craft by washing out or eliminating persistent follow-up signals to shift the apparent electrical null of the follow-up to coincide with the aerodynamic null of the control surface.

Another object is to accurately maintain desired attitude of the craft about the pitch axis during turns by removing persistent turn components from the rate gyroscope signals.

Another object is to provide accurate altitude control by washing out or eliminating persistent follow-up signals.

The invention contemplates a control system adapted to automatically trim the craft by operating a control surface and including a follow-up device operated by movement of the control surface and adapted to provide signals corresponding to the position of the control surface, filter means for attenuating persistent signals of relatively low frequencies and receiving the follow-up signals, means for providing signals corresponding to the attitude of the craft, and driving means responsive to the output of the filter means and to the attitude signals and adapted to operate the craft control surface. Also, an altitude displacement signal may be applied to the filter means to provide an altitude rate signal and the altitude displacement signal and the altitude rate signal are used to control the driving means.

In addition, the system may include means responsive to rate of change of attitude of the craft about the control axis and the output of the rate responsive means is applied to the filter means to attenuate the components of the output of the rate responsive means corresponding to rate of change of attitude of the craft about an axis at an angle to the control axis.

The foregoing and other objects and advantages of the invention will appear more fully hereinafter from a consideration of the detailed description which follows, taken together with the accompanying drawings wherein one embodiment of the invention is illustrated. It is to be expressly understood, however, that the drawings are for the purposes of illustration and description only, and are not to be construed as defining the limits of the invention.

Figure 2:
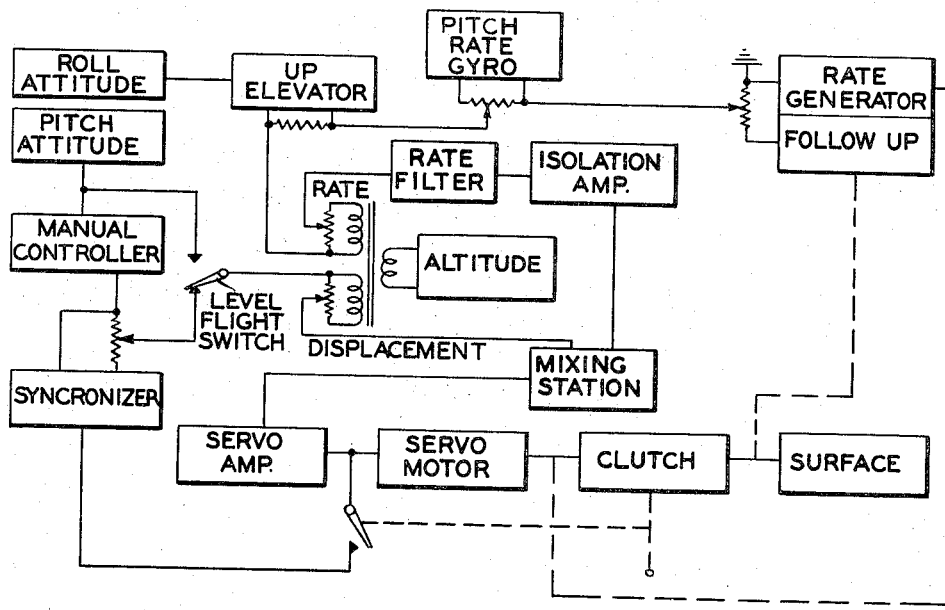

In the drawings wherein like parts are marked alike:

Figure 1 of the drawing is a schematic wiring diagram showing a control system for aircraft constructed according to the invention;

Figure 2 is a block diagram showing the signal transmission from the reference devices to the servomotor and control surface of Figure 1.

Referring first to Figure 2 for a broad description of the present invention, it will be seen that two substantially independent lines of signal transmission are combined at a mixing station. The combined signals are transmitted to a servoamplifier which, after amplifying the signal and detecting its phase, develops an output to operate a servomotor. When the clutch between the servomotor and the control surface is engaged, the servomotor moves the control surface; when the clutch is not engaged, the same signal that goes to the servomotor also goes to a synchronizer which then develops a further signal to oppose the input signal to the amplifier so that no output develops for the servomotor.

Referring now to Figure 1 of the drawings for a more detailed description of the novel control system of the present invention, the control system is shown as incorporated in the pitch control channel of the craft. The control system comprises an attitude gyroscope 1 having its spin axis XX positioned vertically and rotatable about mutually perpendicular axes YY, ZZ parallel to the pitch and bank axes, respectively, of the craft. An inductive device 3 has a single phase rotor winding 5 energized by an alternating current source S and rotatable in response to rotation of the gyroscope about the pitch axis. Inductive device 3 also includes a three-phase stator winding 7 inductively coupled to rotor winding 5 and connected back-to-back to a three-phase stator winding 9 of an inductive device 11. Stator winding 9 is inductively coupled to a pendulous single phase rotor winding 13.

The error signal between inductive devices 3 and 11 is applied to a pitch erection amplifier 15, which may include a multivibrator, and be of the kind shown and described in application Serial No. 102,671, filed July 1, 1949 by Corles M. Perkins and Alan M. MacCallum and now U. S. Patent No. 2,577,912, issued December 11, 1951 and assigned to the same assignee as the present application. The output of the pitch erection amplifier in the form of pulsed signals is applied to the variable phase winding 17 of a two-phase reversible motor 19 having its fixed phase 21 energized by alternating current source S. The motor is arranged to exert a torque on the gyroscope about the bank axis to precess the gyroscope to vertical position about the pitch axis. Inductive device 3 provides signals corresponding to the attitude of the craft about the pitch axis relative to the vertical.

Stator winding 7 of inductive device 3 is connected back-to-back with a three-phase stator winding 23 of an inductive device 25 having a single phase rotor winding 27 operated manually by the pilot through a stick controller 29. The attitude of the craft may be changed by the pilot by manually operating the stick controller and displacing rotor winding 27 of inductive device 25 relative to its stator.

A pitch synchronizer 31 comprises an inductive device 33 having a single phase rotor winding 35 connected across alternating current source S and rotated by a motor 37 having its fixed phase 39 energized by alternating current source S and its variable phase 41 energized in a manner described below. Rotor winding 35 is inductively coupled to a single phase stator winding 43 connected across a potentiometer 45 having its movable contact 47 connected to rotor winding 27 of inductive device 25; movable contact 47 adjusting the initial amplitude of the signal from inductive device 33.

Altitude signals are provided by a barometric altitude device 49 which may be of the kind shown and described in Patent No. 2,512,902, issued June 27, 1950 to Francis Henry S. Rossire and assigned to the same assignee as the present application. The altitude device includes a pressure sensitive aneroid 51 drivably connected through a clutch 53, operated by a solenoid 55, to a spring centered single phase rotor winding 57 of an inductive device 58 energized by alternating current source S and inductively coupled to a single phase stator winding 59 connected across the primary winding 61 of a transformer 63. A secondary winding 65 of transformer 63 is connected across a potentiometer 67 and in series with a switch 69 to potentiometer 45. The initial amplitude of the altitude signal is adjusted by an adjustable contact 71. Adjustable contact 71 of potentiometer 67 is connected in series with a secondary winding 73 of a transformer 75 to the input of an amplifier 77 of any suitable kind, the connection to the latter amplifier being by way of a suitable lead 73a. With the arrangement described, the signals from the attitude gyroscope, stick controller, pitch synchronizer and altitude device are added algebraically and applied to the amplifier.

Amplifier 77 includes two amplifying stages 79, 81 and a discriminator 83 having electron tubes 85, 87 to detect the phase of the voltage impressed on the amplifier. A magnetic amplifier 89 has a pair of core members 91, 93, each having wound thereon a primary winding 95, a secondary winding 97 and a control winding 99. The control windings of cores 91, 93 are connected to the plate circuits of tubes 85, 87, respectively. Primary windings 95 are connected in series and are energized by alternating current source S. Secondary windings 97 are connected in series opposition with one another and through a switch 101 to variable phase winding 41 of motor 37 of pitch synchronizer 31.

A two-phase reversible servomotor 103 is connected through reduction gearing 105 and a manually operated clutch 107 to a control surface 109, such as the craft elevator. Clutch 107 may be incorporated in a disconnect device of the kind shown in application Serial No. 138,423, filed January 13, 1950 by Francis Henry S. Rossire and now U. S. Patent No. 2,663,519 issued December 22, 1953 and assigned to the same assignee as the present application. Clutch 107 may be operated manually by an engaging handle 111 connected through suitable means to the clutch. When clutch 107 is disengaged, control surface 109 may be operated manually by the pilot independently of the automatic pilot through a conventional control stick 113 connected through cables 115 to the control surface.

Motor 103 has its fixed phase 117 connected to alternating current source S and its variable phase 119 connected across secondary windings 97 of magnetic amplifier 89 in parallel with winding 41 of pitch synchronizer motor 37. A rate generator 121 is drivably connected to servomotor 103 and has one winding 125 connected across alternating current source S and a second winding 127 in which is induced a voltage corresponding to the speed of rotation of motor 103. Follow-up inductive device 123 has a single phase rotor winding 129 connected across alternating current source S and a single phase stator winding 131 connected in series with winding 127 of rate generator 121 across a potentiometer 133. Follow-up device 123 is connected to the control surface for movement thereby so that the null position of the inductive device coincides with the normal streamlined position of the control surface. The follow-up device is connected to control surface 109 irrespective of whether the control surface is drivingly connected by clutch 107 to motor 103 or whether the automatic pilot has been disengaged from the surface and the latter has been placed under the direct manual control of lever 113. In either event the follow-up device provides a signal corresponding to the displacement of the control surface from its streamlined position.

A pitch rate gyroscope 135 is drivably connected to a single phase inductive device 137 to provide damping signals for attitude control of the craft. Gyroscope 135 has its spin axis AA disposed vertically and its gimbal axis BB positioned parallel to the roll axis of the craft, and the rotor preferably rotates in a counter-clockwise direction. Rotor winding 139 of inductive device 137 is energized by alternating current source S and is driven by rotation of rate gyroscope 135 about its gimbal axis BB. Stator winding 141 of inductive device 137 is inductively coupled to rotor winding 139 and is connected across a potentiometer 143 and to moveable contact 145 of potentiometer 133.

An inductive device 147 is mounted on gyroscope 1 to provide signals corresponding to the attitude of the craft about the bank axis. Inductive device 147 comprises a single phase rotor winding 149 energized by alternating current source S and a single phase stator winding 151 inductively coupled thereto and connected by way of leads 152 to the input of an amplifier 153 of any suitable kind which provides a voltage of fixed phase irrespective of the phase of the signal from inductive device 147. A typical amplifier is shown in U. S. Patent No. 2,585,162, issued February 12, 1952 to P. A. Noxon. The fixed phase output of the amplifier is applied by way of leads 154 to a transformer 155 having its secondary winding 157 connected across a resistor 159 and to movable contact 161 of potentiometer 143. A voltage appears across resistor 159 corresponding to the amount of bank attitude of the craft to provide up-elevator and prevent the nose of the craft from dropping while executing a turn in either direction.

A secondary winding 163 of transformer 63 of barometric altitude device 49 is connected across a potentiometer 165 and to resistor 159 to provide an altitude displacement signal from which an altitude rate signal is derived in the manner described below.

The follow-up voltage from inductive device 123, the servo rate signal from rate generator 121, the pitch rate signal from potentiometer 143, the up-elevator signal from resistor 159 and the altitude displacement signal from potentiometer 165 are added algebraically and are applied to the input of a filter circuit 167, which preferably is of the kind shown and described in application Serial No. 90,236, filed April 28, 1949 by Alfred Bennett and John C. Owen and assigned to the same assignee as the present application. The filter attenuates or washes out persistent signals of relatively low frequencies and high frequency signals pass the filter unattenuated. The filter also derives altitude rate from the altitude displacement signal from potentiometer 165 as described in the above application.

The algebraic sum of the signals and voltages is applied through a potentiometer 169 connected to center tap 171 of potentiometer 165. The adjustable tap 173 of potentiometer 169 is connected to the first amplifier stage 175 of filter circuit 167. The output of amplifier stage 175 is applied to a discriminator 177 to discriminate the phase of the output of amplifier stage 175.

A time-delay tube 179 has a pair of heaters 181, 183 connected in the plate circuits of discriminator 177 and one or the other of the heaters is energized as determined by the phase of the amplified voltage. Heaters 181, 183 are positioned in heat exchange relation with resistors 185, 187, respectively, connected in a bridge circuit 189, which is unbalanced when one or the other heater is energized. The voltage appearing across bridge circuit 189, when the bridge is unbalanced, is amplified in two stages 191, 193 and is applied as a feed-back voltage to the primary winding 195 of a transformer 197. Secondary winding 199 of transformer 197 is connected across potentiometer 169.

Potentiometer 169 is connected to an isolation amplifier 201 and the output of amplifier 201 is connected to a primary winding 203 of transformer 75. The signals impressed across secondary winding 73 of transformer 75 are added algebraically to the filtered signals from filter circuit 167 and the sum is applied to the input of amplifier 77 as described above.

The craft may be flown manually by the conventional manual control stick 113 when clutch 107 is disengaged by handle 111. When engaging handle 111 is operated to disengage clutch 107, switch 101, connected to engaging handle 111 by means not shown, is moved to closed circuit position and connects synchronizer motor 37 to the output of amplifier 77. The motor drives inductive device 33 to a position to nullify signal voltages developed by any of the other inductive devices of the system. By this arrangement the novel automatic pilot system hereof during manual craft control is constantly preconditioned to take over craft control at any time smoothly and without imposing any undue stress or strain on the airframe.

Automatic control of the craft is attained by operating handle 111 to engage clutch 107 and drivably connect the control surface to servo motor 103. Switch 101 is opened when handle 111 is operated to engage clutch 107 and synchronizer motor 37 is disconnected from the output of amplifier 77. When control of the craft is changed from manual to automatic, the craft continues to fly in the same attitude as it was flying when under manual control.

The synchronizer 31 prevents transients in pitch when the manual control of the craft is changed over to automatic control and serves as a safety device should inadvertent signals exist in the system, such as would occur with a displaced position of stick controller 29.

When the craft is flying automatically and clutch 53 of altitude control 49 is engaged, the craft flies precisely to the altitude reference irrespective of a change in ship's trim because of loading or other cause. The filter circuit circumvents the need to maintain a constant error from reference such as may occur from improper adjustment of follow-up device 123 relative to control surface 109 to correct for aerodynamic unbalance.

When the control surface is displaced from its neutral or trailing position and maintained steadily in a new position to accommodate a change in aerodynamic trim, the signal from inductive device 123 is a persistent one and is washed out by filter circuit 167, thus providing automatic trimming of the craft to accommodate the new craft attitude.

When the craft makes a continuous turn, turn rate gyroscope 135 unavoidably provides a signal in the pitch channel which includes a turn component. Since the turn rate component of the signal is a persistent one, it is washed out by the filter and the transmitted signal corresponds to true pitch rate.

The voltage from filter circuit 167 is added algebraically to the signals from attitude signal developing device 3, manually controlled signal developing device 25 and synchronizer controlled signal developing device 33 and the sum is applied to amplifier 77 to drive the control surface to a position in which the follow-up inductive device 123 nullifies the existing voltage in the system.

If the craft changes attitude due to a change in loading or other cause, the craft will trim automatically due to a novel feature of the control system. Inductive device 3 of the attitude gyroscope will provide a pitch signal which operates servomotor 103 and displaces control surface 109 to return the craft toward level flight attitude. As the craft returns toward level flight attitude, the pitch attitude signal decreases and the follow-up signal predominates and operates servo motor 103 in the opposite direction to drive the control surface toward streamlined position. When a balance is effected between attitude inductive device 3 and follow-up inductive device 123, the control surface is displaced from streamlined position and the craft continues to fly in a climb or dive attitude. The persistent signal from follow-up inductive device 123 is washed out by filter circuit 167 and the signal from inductive device 3 of the attitude gyro further displaces the control surface from streamlined position to a steady state position and the plane returns to level flight attitude.

When the craft is to be flown at a new altitude, stick controller 29 is operated manually and provides a pitch signal to displace control surface 109 and cause the craft to climb or dive. The stick controller normally is maintained in a centered position by a detent (not shown) and a button must be depressed to move the stick controller from the detent position. In a manner described more fully in U. S. Patent No. 2,553,280, issued May 15, 1951 to F. H. S. Rossire, this opens a switch 205 in series with solenoid 55 of clutch 53 to release inductive device 58 from driving engagement with aneroid 51, whereupon rotor 57 of inductive device 58 is moved to centered position. When the craft has attained a desired altitude, stick controller 29 is moved manually to centered position and the button on the stick is released, whereupon switch 205 closes and clutch 53 drivably connects rotor 57 of inductive device 58 to aneroid 51. The craft then continues to fly automatically at the new altitude.

To return the craft to level flight attitude when the craft is diving or climbing, switch 69 is moved to dotted line position to disconnect inductive device 25 of stick controller 29 and inductive device 33 of synchronizer 31 from the circuit and the craft flies independently of the stick controller and synchronizer. With switch 69 in the system, the human pilot has the option of returning the craft to level flight either by moving stick controller 29 or switch 69. The advantage of switch 69 is that in an emergency or when the craft has been placed in a peculiar attitude and due to fog or darkness it is difficult to determine the level flight attitude of the craft, merely operating switch 69 will return the craft to a level flight attitude automatically.

The control system described may be changed from manual control to automatic control without producing abrupt deflections of the craft control surfaces and erratic flight of the craft. Also, the craft may be trimmed automatically by changing the deflection of the control surface to accommodate a shift in loading of the craft or other cause. The craft is maintained in a desired attitude about the pitch axis during turns by removing persistent turn components from the rate gyroscope signals.

The system has been described in connection with the pitch control channel of a craft but it should be understood that the system may be applied to the bank control channel as well by eliminating the up-elevator signal and by substituting bank attitude and bank rate signals for the corresponding pitch signals and by using direction signals instead of altitude signals.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In a control system for the elevator surface of an aircraft, a servomotor adapted to be connected to said surface, reference means adapted to be operatively connected with said surface for developing a follow-up signal corresponding to the displacement of said surface from a predetermined position, reference means for developing a signal corresponding to the displacement of said craft from a predetermined attitude, reference means for developing a signal corresponding to the rate of change of attitude of said craft, reference means for developing a signal corresponding to the displacement of said craft from a predetermined altitude, and means connecting said reference means with said servomotor for the operation of the latter, including a time delay device having an input receiving the follow-up signal, attitude signal, rate of change of attitude signal and altitude signal, said time delay device providing signals at said input in opposition to the signals received there to cancel persistent follow-up signals for trimming the craft automatically and to cancel persistent rate of change of attitude signals and to develop rate of change of altitude signals from the altitude signals.

2. A control system for moving a surface to control a craft about an axis, comprising power means for moving the surface, follow-up means for providing a follow-up signal corresponding to the displacement of the control surface from a normal position, means for providing a signal corresponding to the rate of change of attitude of the craft about its said axis, a double ended normally balanced circuit for receiving said follow-up and rate signals and including a pair of elements each comprising a heat responsive variable resistor and a heater therefor and having a relatively long time constant due to thermal inertia, each of said variable resistors including one leg of a normally balanced Wheatstone bridge having a pair of input terminals and a pair of output terminals, a potential source connected between said pair of input terminals, and each of said heaters being connected in one side respectively of said double ended circuit, means combining said signals and applying the latter to said circuit to raise the heat level of one heater and decrease the heat level of the other heater, means for feeding the output of said bridge back to said input to cancel sustained signals at said input, means responsive to the attitude of the craft to provide a corresponding signal, means for summing said attitude signal and the difference between the input signal to said circuit and the output of said bridge, and means for operating said power means from said summation to move the control surface in accordance therewith.

3. A control system for operating a surface to control a craft about the pitch axis comprising means for providing a displacement signal corresponding to the displacement of the craft from a predetermined altitude, means responsive to said signal for developing an integrated signal, means for opposing said displacement signal by said integrated signal to develop a resultant signal, and means for combining said resultant signal and said displacement signal, and means controlled by said combined signal for operating said control surface in accordance therewith.

4. A system for operating a surface to control a craft about the pitch axis comprising, means responsive to the pitch attitude of the craft for developing a corresponding voltage, means responsive to displacement of the control surface from a normal position for providing a corresponding follow-up signal, means responsive to the rate of pitch of the craft for providing a corresponding signal, means responsive to the attitude of the craft about the roll axis for providing a signal of a phase corresponding to a pitch attitude voltage, means responsive to change in altitude of the craft for providing a corresponding signal, circuit means for receiving said signals and attenuating said signal upon persistence of said signals to provide an output, means for combining said output and said attitude voltage, and means responsive to said combination for operating the control surface in accordance therewith.

5. A control system for selectively operating a surface manually and automatically to control a craft about its pitch axis, comprising power means for moving said surface, first signal means for providing a follow-up signal corresponding to displacement of the control surface from a normal position, means for providing a signal corresponding to the rate of displacement of the control surface, means responsive to the rate of change of pitch attitude of the craft for providing a corresponding rate signal, means responsive to the displacement of the craft from a predetermined altitude for providing a corresponding signal, circuit means receiving said signals and attenuating persistent signals of relative low frequency to provide a circuit output, said circuit output including a signal corresponding to the altitude rate, signal means responsive to the pitch attitude of the craft for providing a corresponding signal, means for summing said attitude signal and said circuit output, power means responsive to said signal combination for operating said control surface in accordance therewith, and means responsive to said circuit output and attitude signal for providing a signal to maintain the net value of said signals at zero when the craft is controlled manually.

6. In a system for controlling a craft about a craft axis, means responsive to the rate of turn of the craft about a point in space to develop a corresponding sustained output and responsive to the rate of change of attitude of the craft about said axis to produce a corresponding transient output, and time delay means receiving said output and attenuating the sustained output and providing an effective output corresponding to the rate of change of attitude of the craft about the axis.

7. A system for operating a control surface of a craft, comprising a gyroscope responsive to the rate of change of pitch of the craft and to the rate of turn of the craft, means actuated by said gyroscope for producing a signal voltage including a transient component corresponding to the rate of pitch of the craft and a sustained component corresponding to the rate of turn of the craft, a circuit having a relatively long time constant receiving said signal voltage and developing a voltage after a period of time in opposition to the sustained component to cancel the sustained component, and means responsive to the signal voltage and to the opposition voltage for operating said surface in accordance therewith.

8. A control system comprising power means for operating a control surface, follow-up means for providing a follow-up signal corresponding to displacement of the surface from a predetermined position, means responsive to rate of change of pitch and to rate of turning of the craft to provide corresponding rate signals, a circuit having a relatively long time constant for receiving the follow-up and rate signals and providing signals in opposition to the rate of turning signals and to persistent follow-up signals, means responsive to pitch attitude of the craft for providing a corresponding signal, means for summing the follow-up signal, the rate signal, the opposition signal and the pitch attitude signal, and means for operating the power means from the signal sum to operate the control surface.

References Cited in the file of this patent

UNITED STATES PATENTS

| | | |
|---|---|---|
| 1,988,458 | Minorsky | Jan. 22, 1935 |
| 2,045,579 | Carlson | June 30, 1936 |
| 2,143,140 | Carlson | Jan. 10, 1939 |
| 2,401,168 | Kronenberger | May 28, 1946 |
| 2,429,642 | Newton | Oct. 28, 1947 |
| 2,464,629 | Young | Mar. 15, 1949 |
| 2,487,697 | Conviser | Nov. 8, 1949 |
| 2,507,304 | Hofstadter | May 9, 1950 |
| 2,512,902 | Rossire | June 27, 1950 |
| 2,515,349 | Kutzler et al. | July 18, 1950 |
| 2,546,555 | Meredith et al. | Mar. 27, 1951 |
| 2,568,719 | Curry | Sept. 25, 1951 |
| 2,570,905 | Young et al. | Oct. 9, 1951 |
| 2,580,512 | Broadbent et al. | Jan. 1, 1952 |
| 2,592,173 | Noxon et al. | Apr. 8, 1952 |
| 2,595,868 | Milsom | May 6, 1952 |
| 2,619,623 | Meredith | Nov. 25, 1952 |
| 2,655,327 | McGoldrick | Oct. 13, 1953 |